US009229472B2

(12) United States Patent
Tsukamoto et al.

(10) Patent No.: US 9,229,472 B2
(45) Date of Patent: Jan. 5, 2016

(54) METHOD FOR SUPPLYING ELECTRIC POWER TO A TIMEKEEPING CIRCUIT WITHIN A PORTABLE ELECTRONIC DEVICE

(75) Inventors: Yasumichi Tsukamoto, Yamato (JP); Shigefumi Odaohhara, Yamato (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 612 days.

(21) Appl. No.: 13/476,319

(22) Filed: May 21, 2012

(65) Prior Publication Data
US 2012/0327749 A1 Dec. 27, 2012

(30) Foreign Application Priority Data

Jun. 24, 2011 (JP) .................. 2011-139969

(51) Int. Cl.
G06F 1/14 (2006.01)
G06F 1/26 (2006.01)
G06F 1/32 (2006.01)

(52) U.S. Cl.
CPC *G06F 1/14* (2013.01); *G06F 1/263* (2013.01); *G06F 1/3212* (2013.01); *Y02B 60/1292* (2013.01)

(58) Field of Classification Search
CPC .......... G04C 10/14; G04C 10/04; G06F 1/14; G06F 1/3212; G06F 1/263; Y02B 60/1292
USPC .................. 368/203–205; 320/111
See application file for complete search history.

(56) References Cited

U.S. PATENT DOCUMENTS

| 5,886,954 | A | * | 3/1999 | Asami et al. ..................... 368/67 |
| 6,463,010 | B1 | * | 10/2002 | Nakamiya et al. ............... 368/64 |
| 6,693,851 | B1 | * | 2/2004 | Fujisawa et al. ............... 368/203 |
| 7,057,309 | B2 | * | 6/2006 | Odaohhara ..................... 307/80 |
| 2006/0265623 | A1 | | 11/2006 | Dinescu |
| 2009/0236914 | A1 | | 9/2009 | Liu et al. |
| 2010/0061193 | A1 | * | 3/2010 | Kasuo et al. .................. 368/204 |
| 2010/0182880 | A1 | * | 7/2010 | Asami et al. .................. 368/204 |
| 2012/0057437 | A1 | * | 3/2012 | Kato et al. .................... 368/204 |

FOREIGN PATENT DOCUMENTS

| CN | 1304499 | A | 7/2001 |
| CN | 1455335 | A | 11/2003 |
| CN | 201589993 | U | 9/2010 |
| CN | 201601534 | U | 10/2010 |

(Continued)

*Primary Examiner* — Sean Kayes
(74) *Attorney, Agent, or Firm* — Antony P. Ng; Russell Ng PLLC

(57) ABSTRACT

An apparatus for providing electric power to a portable computer is disclosed. The apparatus includes a timekeeping circuit, a voltage regulator, a set of battery cells and a controller. The timekeeping circuit includes a clock circuit and a memory for storing a calendar time that is updated based on time information generated by the clock circuit. The battery cells can supply electric power to the voltage regulator, and the voltage regulator is capable of supplying electric power to the timekeeping circuit. When the output voltage from the battery cells exceeds a first voltage threshold, the controller directs the voltage regulator to supply electric power to the timekeeping circuit. When the output voltage from the battery cells drops below the first voltage threshold, the controller directs one of the battery cells to supply electric power to the timekeeping circuit.

3 Claims, 6 Drawing Sheets

(56) References Cited

FOREIGN PATENT DOCUMENTS

| | | |
|---|---|---|
| EP | 1460509 | 9/2004 |
| JP | 08-019188 | 1/1996 |
| JP | 2000-354336 | 12/2000 |
| JP | 2002-222030 | 8/2002 |
| JP | 2006-195560 A | 7/2006 |

\* cited by examiner

METHOD FOR SUPPLYING ELECTRIC POWER TO A TIMEKEEPING CIRCUIT WITHIN A PORTABLE ELECTRONIC DEVICE

PRIORITY CLAIM

The present application claims benefit of priority under 35 U.S.C. §§120, 365 to the previously filed Japanese Patent Application No. JP2011-139969 entitled, "ELECTRIC POWER SYSTEM FOR PORTABLE ELECTRONIC DEVICE EQUIPPED WITH TIMEKEEPING CIRCUIT" with a priority date of Jun. 24, 2011, which is incorporated by reference herein.

BACKGROUND

1. Technical Field

The present invention relates to portable electronic devices in general, and in particular to a method for supplying electric power from a common battery system to a system device and a calendar timekeeping circuit, and for keeping the timekeeping circuit functional as long as possible as the system device's remaining battery charge decreases.

2. Description of Related Art

In a computer system, a semiconductor chip called a Real Time Clock (RTC) chip is typically utilized to provide calendar time to the computer system. In a portable computer, a system battery can be utilized to power the RTC chip. However, the system battery may not always be available—it may be completely discharged or not installed. Hence, the RTC chip is also powered by a dedicated backup battery, generally an RTC coin battery mounted on the system motherboard.

The backup battery also powers an RTC memory, which is used to store the system's calendar time, wakeup time, BIOS setup data, and the like. The RTC chip performs a periodic timekeeping operation to update the stored calendar time. The calendar time in the RTC memory is initialized by a user or in synchronization with a Network Time Protocol (NTP) server.

The RTC memory is usually a volatile memory such as an SRAM. So, if mistaken setup data renders the computer unbootable, the battery system and the RTC coin battery can be removed to erase data stored in the RTC memory. The RTC coin battery cannot be removed unless the system housing is opened, which prevents the user from erasing time information or setup data by mistake.

Previous inventions disclose operating an RTC chip with a main battery and no coin cell. Data that is meant to be non-volatile may be saved into a non-volatile storage when the voltage across the main battery has dropped to a predetermined value. However, without the coin cell and when the system battery is not user-replaceable, the user cannot disable power to the RTC chip to reset the RTC memory. Further, when the system and RTC chip use a common battery system, the need to power the RTC chip should not affect system battery life.

In addition, even when the remaining capacity of the battery system has dropped, there is a need to supply electric power to the RTC chip as long as possible. Also, it is desired that the RTC circuit receiving the supply of electric power from the common battery system should keep its function as much as it can in the case of being supplied with electric power from the RTC coin battery.

SUMMARY

In accordance with a preferred embodiment of the present invention, an apparatus includes a timekeeping circuit, a voltage regulator, a set of battery cells and a controller. The timekeeping circuit includes a clock circuit and a memory for storing a calendar time that is updated based on time information generated by the clock circuit. The battery cells can supply electric power to the voltage regulator, and the voltage regulator is capable of supplying electric power to the timekeeping circuit. When the output voltage from the battery cells exceeds a first voltage threshold, the controller directs the voltage regulator to supply electric power to the timekeeping circuit. When the output voltage from the battery cells drops below the first voltage threshold, the controller directs one of the battery cells to supply electric power to the timekeeping circuit. When the output voltage of the battery cells drops below a second voltage threshold that is lower than the first voltage threshold, the controller stops providing power to the timekeeping circuit.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

I. Structure of an Electric Power System

Figure 1:
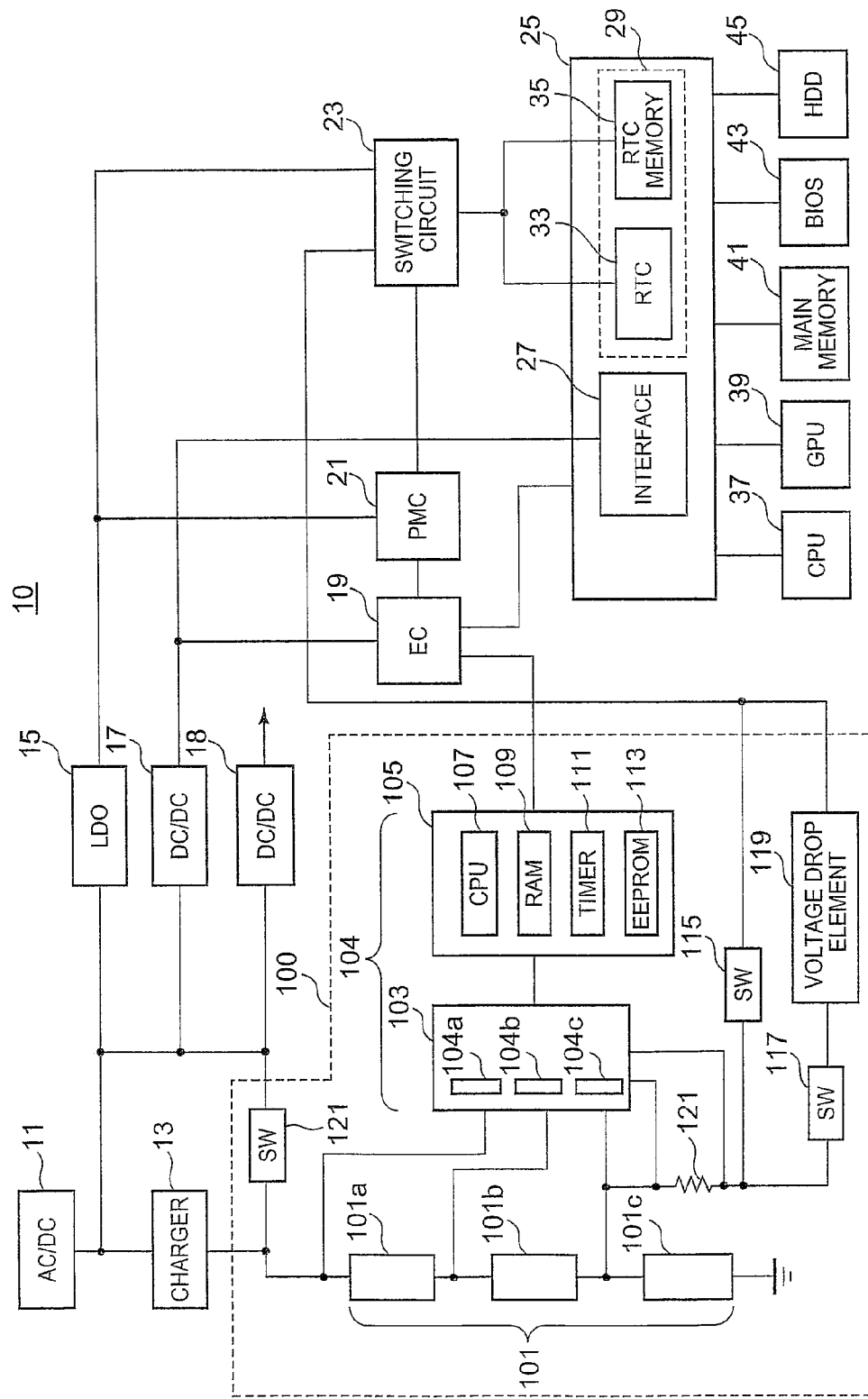
FIG. 1 is a block diagram showing the main components of a laptop personal computer, according to a preferred embodiment of the present invention.

FIG. 1 is a functional block diagram showing main components of a laptop personal computer (hereinafter called a laptop PC) 10 in which an electric power system is incorporated to supply electric power to an RTC circuit. The laptop PC 10 is an example of a portable electronic device, and the portable computer can be a tablet computer or a smart phone. An AC/DC adapter 11 converts AC voltage to DC voltage to supply electric power to a system device and a battery charger 13. The AC/DC adapter 11 may be incorporated in a housing of the laptop PC 10, or connected to the laptop PC 10 through a plug from outside the housing. In the present embodiment, it is assumed that the output voltage of the AC/DC adapter 11 is 20V.

When the AC/DC adapter 11 is connected, the battery charger 13 operates in response to a charge request from a built-in battery system (hereinafter called a battery system) 100 to charge a battery set 101. An LDO 15 converts voltage received from the AC/DC adapter 11 or the battery system 100 into a voltage of 3.3V to power a power management controller (PMC) 21, and further power an RTC circuit 29 via a switching circuit 23. The LDO 15 controls the resistance value of a variable resistive element to keep output voltage within a predetermined range, but a difference between input voltage and output voltage needs to be dissipated as heat. Since efficiency is reduced as the load increases, it is suitable for a low-load power source.

DC/DC converters 17 and 18 are step-down PWM control switching regulators to convert voltage applied by the AC/DC adapter 11 or the battery system 100 into two or more predetermined voltages within a 1V-5V range so that they can correspond to the power state of the laptop PC 10 and the operating voltage of each of the system devices. The DC/DC converter 17 powers an EC 19 and an interface 27 in a chip set 25. The DC/DC converter 18 is composed of multiple switching regulators to supply electric power to the LDO 15 and other devices or functional blocks not supplied by the DC/DC converter 17.

The DC/DC converters 17 and 18 are less efficient in light loading than the LDO 15, but they are more efficient in heavy loading. In FIG. 1, destinations to which the DC/DC converters 17 and 18 supply electric power are shown only in a scope necessary to describe the present invention.

The laptop PC 10 conforms to the ACPI standard, and supports a number of power states: a power-on state (S0), a suspended state (S3), a hibernation state (S4), and a power-off state (S5). In S3, S4, and S5, the operation of the CPU 37 is stopped to put the laptop PC 10 into a halting sate. Electric power consumed during this halting state is called standby electricity.

The LDO 15 operates in all power states, and is stopped only when the AC/DC adapter 11 and the battery system 100 are removed or the voltage across battery cells 101a to 101c drops to turn a switch 121 off. The LDO 15 and the DC/DC converters 17 and 18 operate to power predetermined devices depending on the power state.

In the power-off state, only the LDO 15 is operating to supply electric power to the PMC 21 and the RTC circuit 29. At this time, the standby electricity is least among the power states. The EC 19 is a microcomputer consisting of a CPU, a ROM, an EEPROM, a DMA controller, an interrupt controller, a timer, and the like, further including an A/D input terminal, a D/A output terminal, an SM bus port, an SPI bus port, and a digital input-output terminal.

The EC 19 operates independently of the CPU 37 to control electric power to devices within the laptop PC 10, and control temperature inside the housing. When receiving a signal from the chip set 25 or the PMC 21 to change the power state, the EC 19 instructs the PMC 21 to control the operation of the DC/DC converter 17, 18. The EC 19 periodically communicates with an yMPU 105 of the battery system 100 to receive the remaining capacity of the battery set 101, set charging voltage and charging current, and receive other data such as voltage across the battery cells 101a to 101c. Further, before stopping the operation of the DC/DC converter 17, the EC 19 causes the battery system 100 to generate a calendar time so that the calendar time will continue to be generated even when power to the RTC circuit 29 is completely stopped.

The PMC 21 is manufactured as an Application Specific Integrated Circuit (ASIC) composed of logic circuitry such as a NAND and a NOR circuit, a single transistor, and passive parts, such as resistors and capacitors, including a control circuit and resistors. Since the PMC 21 is constructed only of hardware circuitry without including any processor, the power consumption is quite small. In addition to the EC 19, the control circuits of the DC/DC converters 17 and 18, a power button to be pressed to boot the laptop PC 10, a lid sensor for detecting the opening and closing of the housing to boot the laptop PC 10, and the like are connected to the PMC 21.

Based on instruction from the EC 19, a press of the power button, or an action of the lid sensor, the PMC 21 controls the operation of the DC/DC converter 17 to control the operation of the switching circuit 23 based on the output of the LDO 15. The PMC 21 operates as long as it is supplied with electric power from either the AC/DC adapter 11 or the built-in battery system 100.

The switching circuit 23 consists of an FET and a diode to uninterruptedly switch RTC power from either the LDO 15 or the battery cell 101c, so as not to affect the operation of the RTC circuit 29. A control signal from the PMC 21 performs the switch, so the LDO 15 powers the RTC circuit 29 while the LDO 15 is supplying electric power, and the battery cell 101c powers the RTC when the LDO 15 stops providing power.

The chip set 25 includes the CPU 37, the GPU 39 to which a liquid crystal display (LCD) is connected, the main memory 41, the BIOS_ROM 43, the interface 27 with the HDD 45 or the like, and the RTC circuit 29. The RTC circuit 29 consists of an RTC 33 and an RTC memory 35.

The RTC 33 consists of a crystal oscillator and an oscillating circuit to perform timekeeping to generate a calendar time for system use. Calendar time means a specific moment in time on a calendar, including year, month, day, hour, minute, and second. The RTC memory 35 is a volatile storage device for storing the calendar time generated based on the timekeeping operation of the RTC 33. This calendar time stored is supplied to the OS for use as a time stamp on a file, for schedule management, and the like. Setup and configuration data and a system password are also stored in the RTC memory.

Since the setup data reflects the current system environment most appropriate to the user, it is necessary to make data loss difficult. The LDO 15 powers the RTC circuit 29 while the AC/DC adapter 11 or the battery set 101 is supplying electric power through the switching circuit 23. If neither the AC/DC adapter 11 nor the battery set 101 can supply electric power, the RTC circuit 29 will be powered by the battery cell 101c until the voltage drops to one at which it is necessary to stop electric discharge.

The CPU 37, the GPU 39, the main memory 41, the BIOS_ROM 43, the HDD 45, and the like are connected to the chip set 25. BIOS code stored in the BIOS_ROM 43 contains setup code for configuring hardware while POST (Power On Self Test) is being carried out after the laptop PC 10 is booted. The setup code includes code for changing the switch 115 and the switch 117 to the OFF state to stop power to the RTC circuit 29 while it is being supplied from the battery cell 101c.

When the operation of the laptop PC 10 becomes unstable or the system is to be largely altered, the user often desires to erase the setup data stored in the RTC memory 35, thus using the default setup information instead. When the user makes this choice in the system setup screen, the CPU 37 executes BIOS code to stop the LDO 15, the DC/DC converter 17, and the DC/DC converter 18 through the EC 19, and further instructs the MPU 105 to turn off the switches 115 and 117.

Alternatively, the CPU 37 may change a reset terminal of the RTC circuit 29 to LOW. When erasing the setup data stored in the RTC memory 35, the BIOS uses the default setup data held to carry out POST. A mechanical switch held down with a long and thin rod may be provided in the housing of the laptop PC 10 to operate the switches 115 and 117 in order to reset the RTC memory 35.

The battery system 100 consists mainly of the battery set 101, an analog interface circuit (AFE) 103, an MPU 105, and the like mounted on a printed-circuit board, and housed within the housing of the laptop PC 10. This battery system cannot easily be detached, so it is suitable for powering the RTC circuit 29.

The battery set 101 consists of three or four lithium-ion battery cells 101a, 101b, and 101c connected in series. Each of the battery cells may also consist of two or more battery cells connected in parallel. When three battery cells 101a to 101c are connected in series, the output voltage of the battery set 101 rises to 12.6V immediately after being charged to full capacity, and the output voltage decreases with electric discharge. When the output voltage drops to 9V, the supply of electric power to the system devices is stopped. When it drops to 8.1V, the battery set 101 stops electric discharge and the battery cell 101c supplies electric power to the RTC circuit 29. Further, when it drops to 7.5V, the supply of electric power from the battery system 100 to the outside is completely stopped.

In the present invention, the supply of electric power to the RTC circuit 29 is maintained as long as possible. After the battery system 100 completely stops its output, it generates a calendar time on behalf of the RTC circuit 29 until power can be restored to the RTC circuit 29.

The AFE 103 measures a difference in potential between both ends of each of the battery cells 101a to 101c and a difference in potential between both ends of the sense resistor 121, converts the differences to digital values, and sends the digital values to the MPU 105. The AFE 103 is also connected to the control circuits of the switches 115, 117, and 121, and in the event of a failure in the battery system 100, the switches are turned off in accordance with an instruction from the MPU 105. MOS type FETs can be used for the switches 115, 117, and 121.

The AFE 103 calculates charging current flowing through the battery set 101 and discharging current from the potential difference across the sense resistor 121, converts them to digital values, and sends the digital values to the MPU 105. The AFE 103 is provided with bypass discharge circuits 104a to 104c so that when a difference in voltage between the battery cells 101a to 101c exceeds a predetermined value, only a battery cell higher in voltage is discharged to equalize voltage between the battery cells. Each of the bypass discharge circuits 104a to 104c consists of a switch and a resister connected in series, and is connected to both ends of each of the battery cells. The AFE 103 periodically measures the difference in voltage between battery cells to operate one of the bypass discharge circuits 104a to 104c for a battery cell higher in voltage.

The MPU 105 is an integrated circuit with a CPU 107, a RAM 109, a timer 111, and an EEPROM 113 provided in one package. The MPU 105 measures the amount of charge and the amount of discharge based on the voltage and electric current sent from the AFE 103 to calculate the remaining battery capacity. The MPU 105 is also provided with an overcurrent protection function, an overvoltage protection function (also called overcharge protection function), and a low-voltage protection function (also called overdischarge protection function) to control the switches 115, 117, and 121 through the AFE 103 when an abnormality is detected from the voltage or current values received from the AFE 103.

The AFE 103 and the MPU 105 both operate on electric power from the battery set 101. When electric power to the RTC circuit 29 is stopped, the MPU 105 uses the timer 111 to generate the calendar time, and when power to the RTC circuit 29 is restored, the MPU 105 can send the updated calendar time back to the RTC memory 35. The MPU 105 performs control to turn on the switch 115 at normal times or turn it off when the RTC circuit 29 is reset and an abnormality occurs.

The switch 117 and a voltage drop element 119 are connected in series to form a bypass circuit for the switch 115. The voltage drop element 119 is an element, such as a diode, a resistor, or a transistor, to drop voltage to a range appropriate for RTC circuit 29 operation when the voltage across the battery cell 101c is high. Unlike the LDO 15, the voltage drop element 119 does not need to be able to adjust voltage. When the voltage across the battery cell 101c exceeds the RTC circuit's tolerance, the MPU 105 turns switch 115 off and turns switch 117 on until the voltage drops to the tolerance. When that happens, the MPU 105 turns switch 115 on and turns switch 117 off. The MPU 105 and the AFE 103 are considered together as a battery management unit (BMU) 104.

II. Structure of a Switching Circuit

Figure 2:
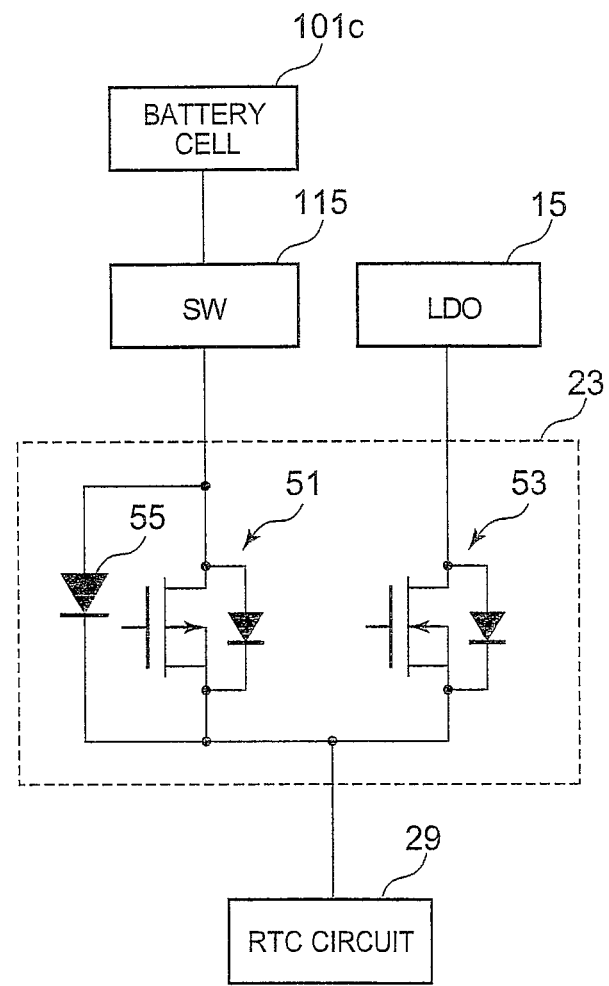
FIG. 2 is a diagram showing the structure of a switching circuit.

FIG. 2 is a diagram showing the structure of the switching circuit 23. This switches the RTC circuit's power source to the LDO 15 while it can supply power, and powers the RTC circuit from battery cell 101c when the LDO 15 is stopped. The switching circuit 23 consists of a p-channel FET 51, an n-channel FET 53, and a diode 55. The source of FET 51 is connected to the battery cell 101c via the switch 115, and the drain is connected to the RTC circuit 29. The anode of diode 55 is connected to the source of FET 51, and the cathode is connected to RTC circuit 29. The drain of FET 53 is connected to LDO 15, and the source is connected to RTC circuit 29.

Voltage is applied to the gates of FET 51 and FET 53 from the PMC 21. The PMC 21 applies or stops applying voltage so that FET 51 and FET 53 operate opposite to each other. While the PMC 21 is applying voltage to the gates of FETs 51 and 53, FET 53 is on and FET 51 is off. The BMU 104 keeps switch 115 on until the remaining capacity of the battery cell 101c is so low it can no longer discharge. During this period, electric power can be supplied from the battery cell 101c to the RTC circuit 29 via the diode 55. However, since the output voltage of the LDO 15 is high, it supplies power to the RTC circuit 29.

When the voltage across any of the battery cells 101a to 101c becomes so low that the BMU 104 turns the switch 121 off, the output of the LDO 15 is stopped, and the operation of the PMC 21 is also stopped to lower the gate voltage of FETs 51 and 53. As a result, FET 51 is changed to the on state and FET 53 is changed to the off state. During switching, when the voltage across the LDO 15 drops, since electric current flows through the diode 55 until the FET 51 is changed to the ON state, the supply of electric power to the RTC circuit 29 is maintained. Then, when the output of the LDO 15 is restored, the PMC 21 applies voltage to the gates of the FETs 51 and 53. At the moment of switching, since electric current flows via the diode 55, power to the RTC circuit 29 is never interrupted.

III. Power System Operation

Next, operation of the RTC circuit power supply will be described with reference to the flowchart of FIG. 3. FIG. 4 is a diagram showing the operating states of essential system devices when the electric power system is operated.

Figure 3:
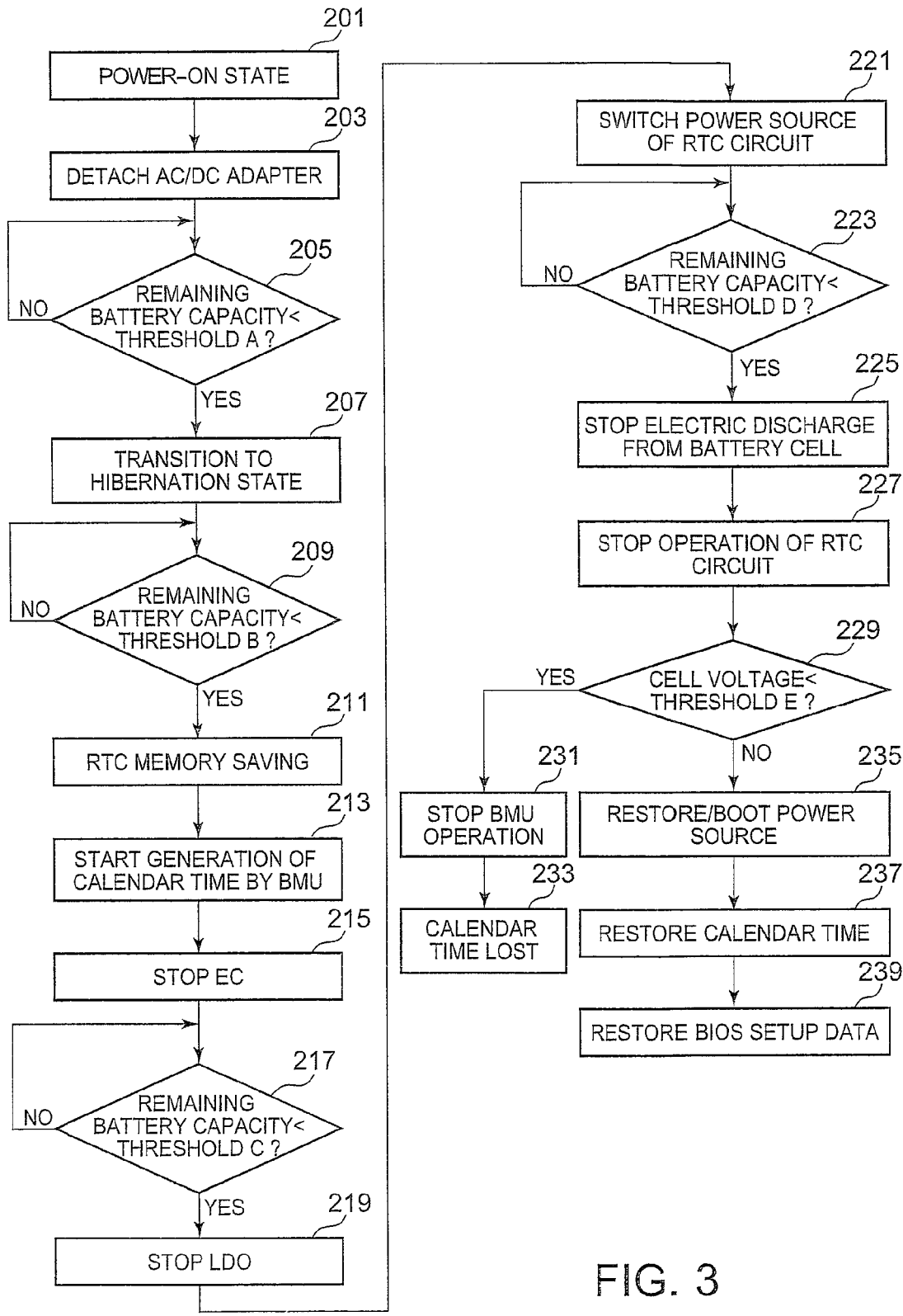
FIG. 3 is a flowchart describing an operation of an electric power system.
Figure 4:
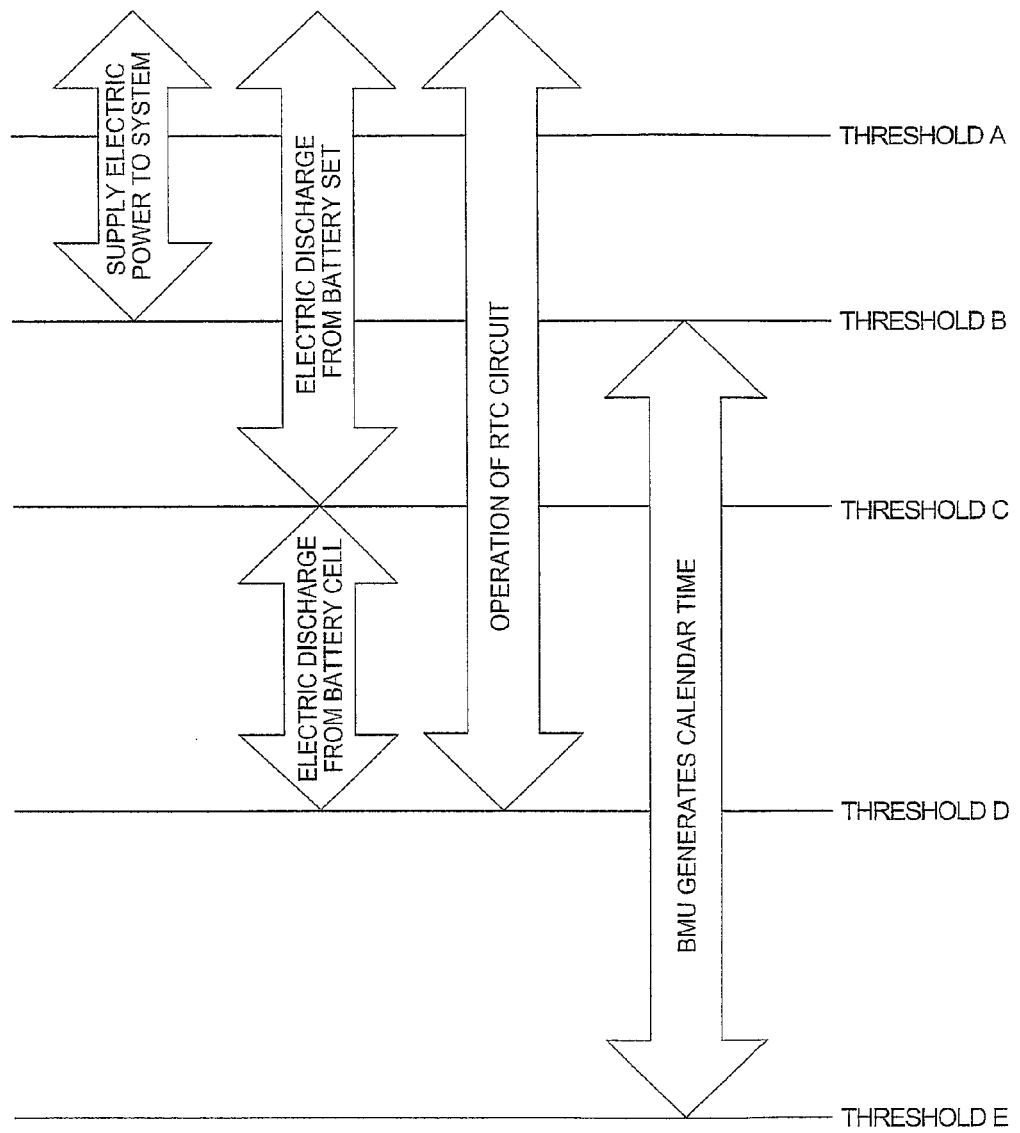
FIG. 4 is a diagram showing the states of main devices when the electric power system operates according to the method shown in FIG. 3.

In block 201 of FIG. 3, the laptop PC 10 is operating in a power-on state. Suppose that the AC/DC adapter 11 is connected, operating the battery charger 13, and hence the battery set 101 is fully charged.

Since the voltage across the battery cells 101a to 101c is at least a predetermined value, the BMU 104 turns on the switches 115 and 121 and turns off the switch 117 so that electric power can be supplied to the LDO 15 and the DC/DC converters 17 and 18 when the AC/DC adapter 11 is detached. Since the output voltage of the AC/DC adapter 11 is higher than the output voltage of the battery set 101, the LDO 15 and the DC/DC converters 17 and 18 operate with power from the AC/DC adapter 11, and the switching circuit 23 switches the power source of the RTC circuit 29 to the LDO 15. About 1 mA flows into the primary side of the LDO 15, about 30 mA flows into the primary side of the DC/DC converter 17, and about 1 A flows into the primary side of the DC/DC converter 18. Further, about 3 µA to 6 µA flows into the RTC circuit 29.

In block 203, the AC/DC adapter 11 is detached, leaving only the battery system 100 as the system's power source. The battery set 101 supplies electric power to the LDO 15 and DC/DC converters 17 and 18, and the remaining battery capacity gradually drops. The EC 19 periodically reports remaining battery capacity to the OS.

In block 205, when the remaining capacity of the battery set 101 drops to threshold A, if hibernation is enabled, the OS requests programs currently running to stop all processes and save their data, to prepare to change the system power state to the hibernation state. The OS provides threshold A to allow enough time for an orderly power state change. As an example, the default threshold A is 5% of a full battery charge.

When the OS notifies the chip set 25 that preparation for hibernation is complete, the chip set 25 stops the DC/DC converter 18 through the EC 19. In block 207, the laptop PC 10 makes a transition to the hibernation state. The battery set 101 continues discharging to power to the LDO 15 and the DC/DC converter 17, thereby further reducing remaining battery capacity.

If discharging were to continue to where the voltage across the battery cells is below 3.0V, voltage would drop sharply. Power to system devices should be stopped before that sharp drop. In block 209, the EC. 19 receives data from the MPU 105 and determines whether the voltage across any of the battery cells 101a to 101c or the remaining capacity of the battery set 101 has dropped to threshold B. At threshold B, remaining battery capacity is considered zero and system operation must stop. In this case, 3.0V can be set for the voltage across any of the battery cells 101a to 101c, or 500 mWh can be set for the remaining capacity of the battery set 101.

In block 211, the EC 19, having determined that remaining battery capacity has dropped below threshold B, copies data stored in the RTC memory 35 into a data area of the BIOS_ROM 43, an EEPROM in the EC 19, or the EEPROM 113 in the MPU 105. This processing may also be performed earlier, upon transition to the hibernation state in blocks 205 and 207.

Then, in block 213, the EC 19 acquires the current calendar time from the RTC memory 35 and sends it to the MPU 105 to start it generating calendar time. The CPU 107 receiving the instruction from the EC 19 stores the received calendar time in the RAM 109, and further gets the timer 111 to work to update the calendar time in the RAM 109. As a result, the MPU 105 generates the calendar time in parallel with the RTC circuit 29 until the remaining capacity of the battery set 101 once again exceeds threshold B and the EC 19 tells the MPU 105 to stop generating calendar time.

Next, in block 215, the EC 19 instructs the PMC 21 to stop the DC/DC converter 17. After this, the supply of electric power to system devices is completely stopped, and the battery set 101 powers only the BMU 104 and the LDO 15.

In block 217, the MPU 105 determines whether the voltage across any of the battery cells 101a to 101c or the remaining capacity of the battery set 101 has further dropped to threshold C. Threshold C is a value at which the battery set 101 completely stops supplying power. In this case, 2.7V can be set for the voltage across any of the battery cells 101a to 101c, or 100 mWh can be set for the remaining capacity of the battery set 101.

Threshold B denotes the minimum value of battery capacity available for the user, while threshold C denotes a value at which battery output must be stopped for safety to keep the battery set usable. In block 219, the MPU 105, determining that the remaining battery capacity has dropped to threshold C, turns off the switch 121 to stop power to the LDO 15. When the output of the LDO 15 is stopped, in block 221, the switching circuit 23 switches the RTC circuit's power source to the battery cell 101c. Since electric power is supplied from the LDO 15 to the RTC circuit 29 until the remaining capacity of the battery set 101 drops to threshold B, the battery cell 101c is not burdened.

At this time, if the voltage across the battery cell 101c is higher than the operating voltage of the RTC circuit 29, the MPU 105 turns off the switch 115 and turns on the switch 117 to supply electric power to the switching circuit 23 after the voltage drop element 119 drops the voltage. Then, when voltage between the battery cells 101a to 101c becomes imbalanced, the AFE 103 discharges the battery cell high in voltage to strike a balance.

In block 223, the MPU 105 determines whether the voltage across any of the battery cells 101a to 101c or the remaining capacity of the battery set 101 has dropped to threshold D. The voltage across the battery cell 101c is normally lowest, but the MPU 105 determines the voltages across all the battery cells 101a to 101c. Threshold D is a value at which electric discharge from the battery cell 101c to the RTC circuit 29 must stop. In this case, 2.5V can be set for the voltage across the battery cell 101c, or 0 mWh can be set for the remaining capacity of the battery set 101. Threshold D is intended to allow an orderly circuit shutdown.

In block 225, the BMU 104, determining that threshold D has been reached, turns off the switch 115 and the switch 117 to stop power to the RTC circuit 29. As a result, RTC operation stops in block 227, and the calendar time stored in the RTC memory 35, the BIOS setup data, and the like are lost.

Battery cell 101c can power the RTC circuit 29 directly from threshold B until threshold D. This is because the RTC circuit's power consumption is low enough that the BMU 104 can safely control battery cell 101c to keep it usable.

When the remaining capacity of the battery set 101 reaches threshold D, the MPU 105 reduces the clock frequency or the sampling period to operate in a power-saving mode. The electric current flowing through the BMU 104 is about 400 µA in the normal mode, but about 20 µA in the power-saving mode.

After that, the battery system 100 cannot power the system at all, but the BMU 104 further operates to continue calendar time generation. If this state continues, the voltage across the battery cells 101a to 101c further drops. In block 229, the BMU 104 determines whether the voltage across any of the battery cells 101a to 101c has dropped to threshold E, a value for ensuring the safety of the battery set 101 or guaranteeing its reuse. The battery manufacturer can set threshold E within the 2.5V to 1.3V range.

When it determines that the voltage across any of the battery cells 101a to 101c has dropped to threshold E, the BMU 104 stops its operation in block 231 and will not operate unless the battery set 101 is replaced, even if the battery charger 13 tries to charge the battery set 101. As a result, the calendar time stored in the RAM 109 is lost in block 233.

Later in block 235, the AC/DC adapter 11 is connected to enable the startup of the laptop PC 10, or the battery set 101 or the entire battery system 100 are replaced with charged units, the BIOS first tries to read BIOS setup data from the RTC memory 35. If the BIOS cannot read the setup data from the RTC memory 35, it uses its default setup data.

In block 237, the EC 19 receives the calendar time from the MPU 105 during POST, stores it in the RTC memory 35, and instructs the RTC 33 to update the calendar time stored in the RTC memory 35. After that, the RTC 33 updates the calendar time in the RTC memory 35.

In block 239, if data in the RTC memory 35 had been lost, the EC 19 will restore it from the setup data that was stored in the nonvolatile memory in block 211. After that, the BIOS can read the setup data from the RTC memory 35 on every startup as normal.

IV. Alternate Power System Operation

Figure 5:
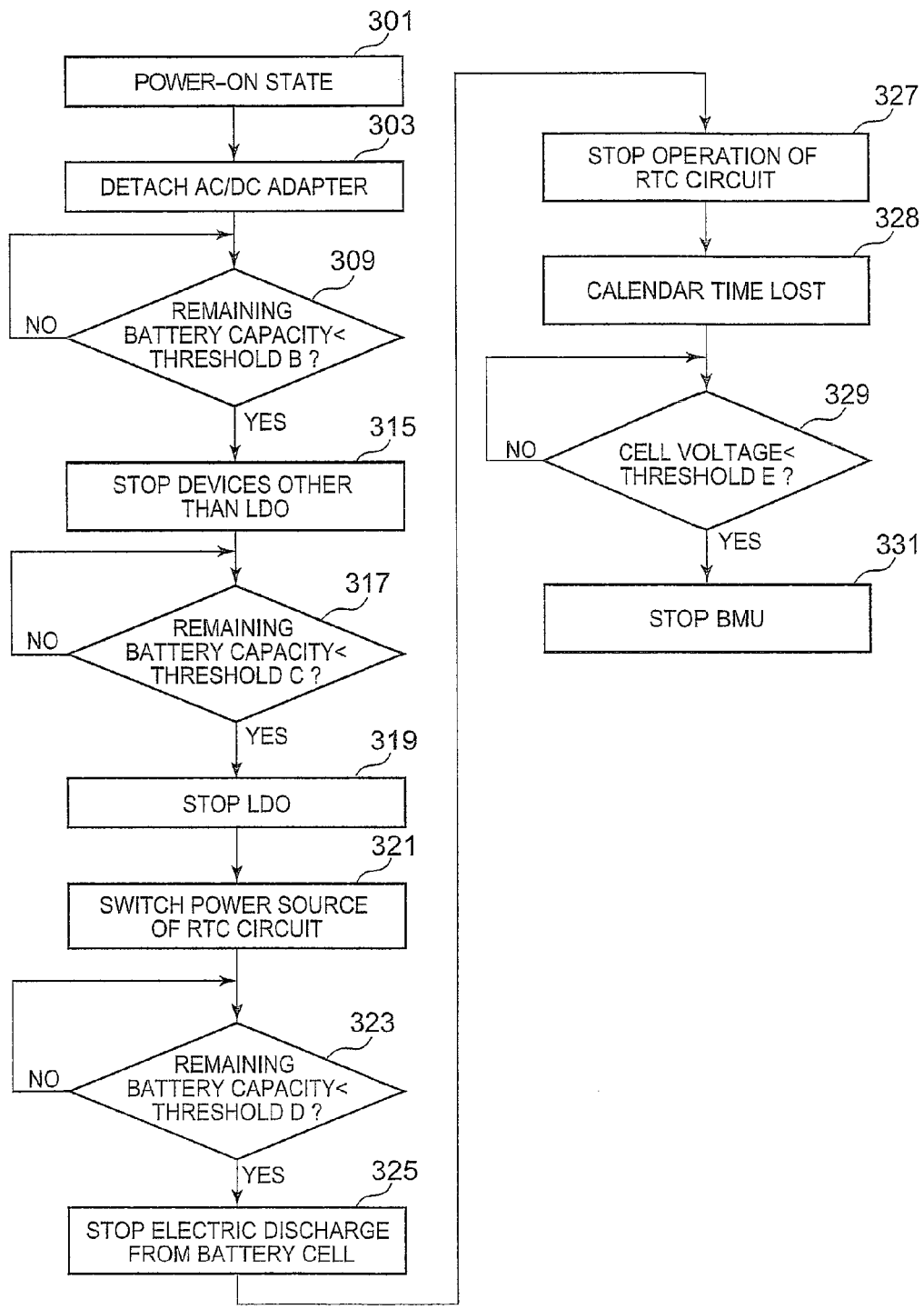
FIG. 5 is a flowchart describing another operation of the electric power system.
Figure 6:
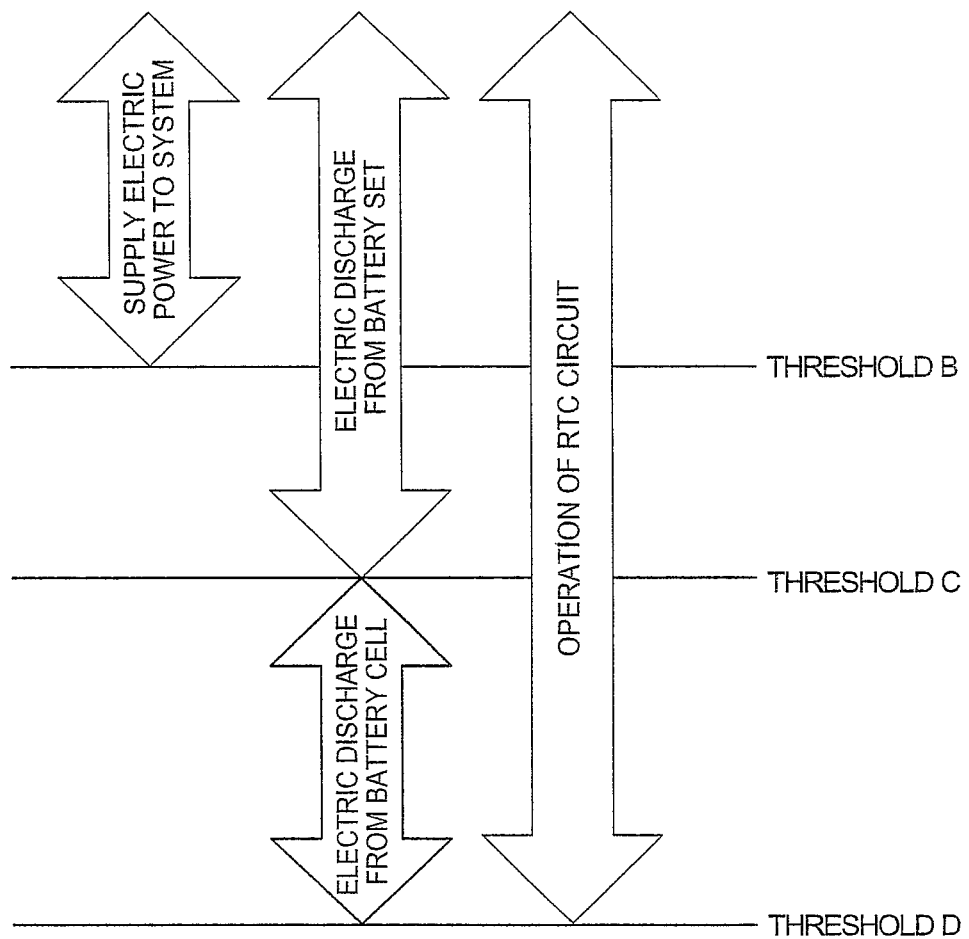
FIG. 6 is a diagram showing the states of main devices when the electric power system operates according to the method shown in FIG. 5.

Next, an alternate power system operation will be described with reference to the flowchart of FIG. 5 and a diagram (FIG. 6) describing device states. In the procedure of FIG. 5, processes corresponding to those in FIG. 3 are cross-referenced to the blocks in FIG. 3 to omit redundant description. Processes of block 301 and block 303 correspond to the processes of block 201 and block 203, respectively. In the procedure of FIG. 5, the processes of blocks 205 and 207 in FIG. 3 can be omitted. A process of block 309 corresponds to the process of block 209. In the procedure of FIG. 5, processes corresponding to those of block 211 and block 213 in FIG. 3 are not performed.

In block 315, the EC 19 notifies the OS that remaining battery power is low. The OS notifies the user that the system will be stopped soon, to prompt the user to finish the operation, transition to the hibernation state, or shut the system down. When the OS orders a system stop, the EC 19 stops the operation of the DC/DC converters 17 and 18 through the PMC 21. As a result, only the PMC 21 and the RTC circuit 29 as the load on the LDO 15 operate powered by the battery set 101. Processes from block 317 to block 327 correspond to processes from block 217 to block 227, respectively. In block 328, the calendar time generated by the RTC circuit 29 and data stored in the RTC memory 35 are lost. At this time, the BMU 104 operates in the power-saving mode, while the MPU 105 operates normally because it generates no calendar time (unlike in block 213 of FIG. 3).

In the procedure of FIG. 5, since the battery system 100 does not have the timer 111 generate the calendar time, it takes longer for the voltage of battery cells 101a to 101c to reach threshold E. The procedure in FIG. 3 and the procedure in FIG. 5 may be chosen on the BIOS setup screen, so that when the laptop PC 10 is stored for a long time before shipment, the procedure in FIG. 5 will be adopted, while when a user starts using the laptop regularly, the procedure in FIG. 3 can be used instead.

As has been described, the present invention provides a method for supplying electric power from a common battery system to a system device and a calendar timekeeping circuit.

While the invention has been particularly shown and described with reference to a preferred embodiment, it will be understood by those skilled in the art that various changes in form and detail may be made therein without departing from the spirit and scope of the invention.

What is claimed is:

1. A method for supplying electric power to a timekeeping circuit within a portable electronic device, said method comprising:
   when said portable electronic device is solely powered by said battery set,
      in response to a remaining capacity of said battery set having dropped to a first threshold, transitioning said portable electronic device to a hibernation mode;
      in response to said remaining capacity of said battery set having dropped to a second threshold, acquiring calendar time information from a RTC memory and sending said calendar time information to a non-volatile memory associated with a processor to allow said processor and said timekeeping circuit to generate new calendar time information concurrently;
      in response to said remaining capacity of said battery set having dropped to a third threshold, switching power source of said timekeeping circuit to only one battery cell within said battery set;
      in response to said remaining capacity of said battery set having dropped to a fourth threshold, ceasing to supply electric power to said timekeeping circuit; and
      in response to said remaining capacity of said battery set having dropped to a fifth threshold, ceasing to provide power to said processor.

2. The method of claim 1, wherein said ceasing to supply electric power to said timekeeping circuit further includes continuing to allow said processor to generate new calendar time information.

3. The method of claim 2, wherein said continuing further includes reducing a clock frequency of said processor.

* * * * *